Patented May 8, 1951

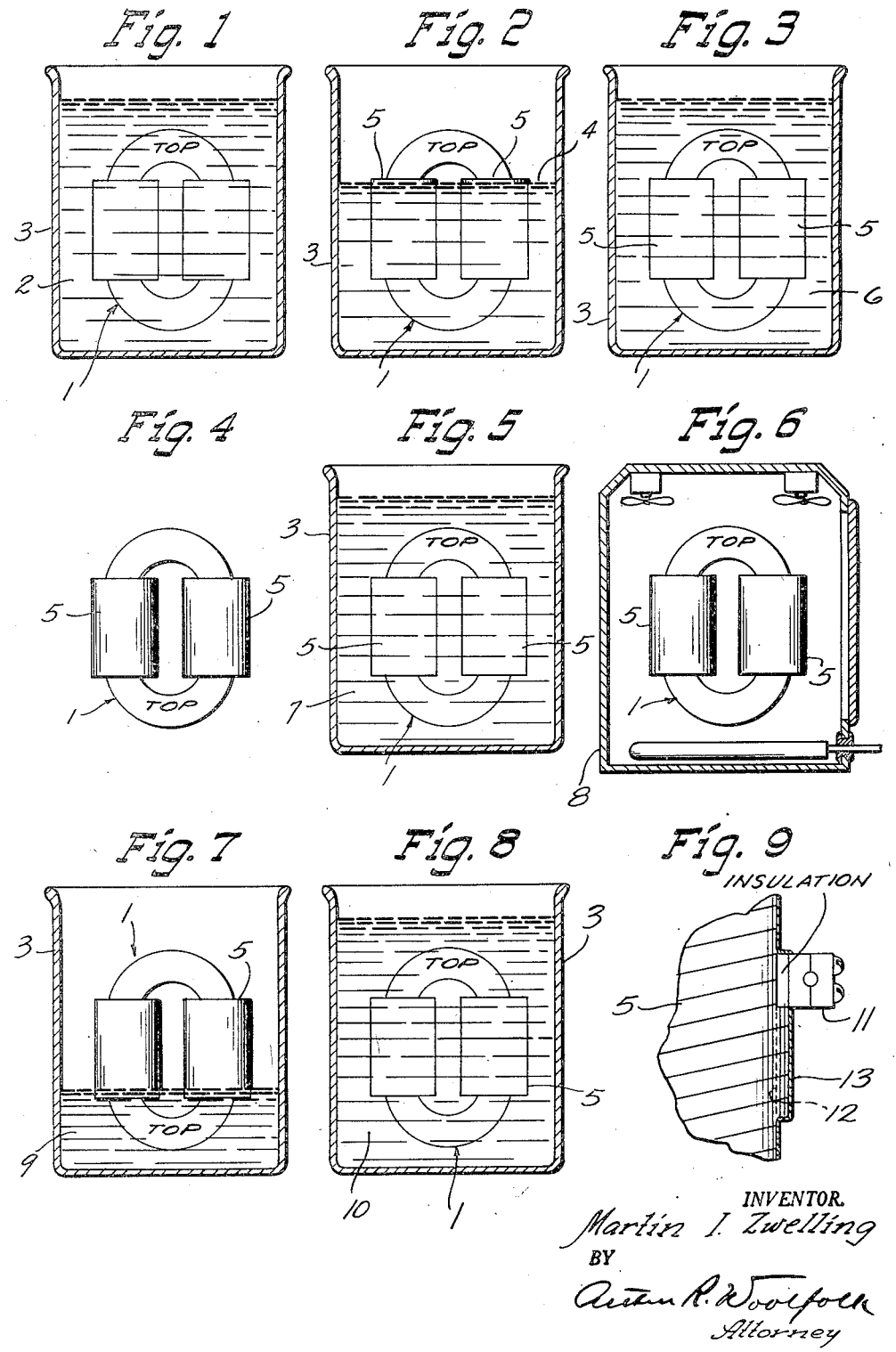

2,551,864

UNITED STATES PATENT OFFICE 2,551,864

METHOD OF COATING AND IMPREGNATING AN ELECTRICAL DEVICE

Martin I. Zwelling, Zanesville, Ohio, assignor to McGraw Electric Company, a corporation of Delaware Application July 14, 1947, Serial No. 760,840

1 Claim. (Cl. 117—70)

This invention relates to the method of coating an electrical device and to the resulting article.

Objects of this invention are to provide a method of coating an electrical device provided with a conducting winding and to the resulting article so as to provide a complete seal for the assembled electrical device which will keep it free from any external deteriorating condition.

Specifically, objects of this invention are to provide a method of forming a coating and the resulting coating for the electrical device which coating partakes of the properties of inorganic glass and organic plastics and has high resistance to moisture, weather, temperature shock, high and low temperature operation, and which also has a high tensile and high compressive strength and has high impact strength.

Further objects are to provide a method of coating and impregnating an electrical instrumentality having a conducting winding and the resulting article which is solidly impregnated throughout the entire winding and has all of the pores closed, the method being such as to produce a coated and solidly filled electrical device having a conducting winding so that the device can be used in the open and exposed to the elements—to moisture, weather, heat and cold—without any deterioration of the device.

Various steps in the process of forming the coating and impregnating the electrical device are shown in Figures 1 through 8.

Figure 9 is a fragmentary view showing a portion of the coated and impregnated coil and showing the coating in section, such view illustrating the manner in which a terminal is secured in the winding.

In order to give a concrete illustration of the method, a transformer has been selected as the electrical device which is to be impregnated and coated, though it is distinctly understood that any suitable type of electrical device having a conducting winding could be treated by this process.

The process is carried out by first impregnating the completely assembled transformed with a low viscosity plastic resin or with a solventless varnish which as previously been activated to effect polymerization or condensation. The material which has been employed in this step with success is what is known in the trade as #73D. This material, as far as can be ascertained, is a 100% solventless varnish based on a phenolic resin which cures to an infusible solid when baked six hours or longer at 275° F. This step is illustrated in Figure 1 in which the transformer indicated generally by the reference character 1 is immersed in the plastic resin or solventless varnish indicated at 2. The vessel 3 in which the liquid 2 is contained has been shown for the sake of illustration as an open vessel, though it is distinctly understood that impregnation in a closed vessel by means of vacuum and subsequently followed by pressure can be employed in accordance with the usual practice.

After the transformer has been impregnated it is removed from the liquid 2 and the solventless varnish or low viscosity plastic resin is cured to a solid state by heating the transformer for six hours at 275° F.

After this curing step has been performed the transformer is dipped into a mixture of 100 parts of water and 160 parts of plaster of Paris. It is, however, dipped only to the point indicated by the reference character 4 in Figure 2, thus leaving the top of the coils 5 of the transformer free of this plaster of Paris mixture. This step is illustrated in Figure 2. Thereafter the transformer is removed and the coating is allowed to drain, to become set and to completely dry. It may be air dried or it may be dried at 150° F. for eight hours. This step in the process, as illustrated in Figure 2 and described immediately hereinabove, results in a form fitting coating, so to speak, substantially surrounding the coils of the transformer and also the lower portion of the core, the top of the cores being uncoated.

The next step is to immerse the entire transformer in a mixture of ethyl ortho silicate as illustrated in Figure 3, the liquid being indicated by the reference character 6. This mixture is composed of 45 parts of the silicate, one part of water, and 27 parts of alcohol, the proportions being given by volume.

Following this immersion as indicated in Figure 3, the transformer is removed from the liquid and inverted so as to allow the silicate mixture to drain, to set and to dry. This draining, setting, and drying process usually takes approximately six hours. It results in a thinned deposit of pure silica throughout the windings and the core.

This step in the process is illustrated in Figure 4. It is to be noted also that the silica impregnates the plaster of Paris form setting coating and tends to seal the pores thereof.

After the above step has been completed the entire unit is immersed in a solventless varnish until all bubbling ceases. The varnish can be the No. 73-D varnish hereinabove described. This varnish is indicated by the reference character 7 in Figure 5. After the transformer has been completely impregnated with the above varnish, it is then cured to a solid state by heating the transformer to 275° F. for six hours. For example, the transformer may be placed in an oven 8 as shown in Figure 6. Obviously in any of the heating steps called for in this process a similar type of oven or other suitable arrangement could be employed.

At this point in the process attention is called to the fact that the solventless varnish at first baking has an extremely low viscosity and tends to run out of the coil. However, by providing the form fitting plaster of Paris coating, such coating acts as a mold and its pores are sealed by both the silicate and varnish and consequently the varnish remains in the windings during the baking as the transformer is turned right-side up as indicated in Figure 6. This baking is continued, as stated, for approximately six hours and results in a solidly impregnated transformer winding, the varnish being unable to run out, and baking to a solid state and filling all of the voids in the windings.

After the varnish has been baked or cured to a solid state as described immediately hereinabove, the transformer is inverted as shown in Figure 7 and the top portion of the transformer is dipped into a liquid, as indicated at 9 in Figure 7, consisting of 100 parts by weight of water and 160 parts by weight of plaster of Paris. This step provides a coating or form fitting covering for the top portion of the coils and the top portion of the transformer. After the step indicated in Figure 7 has been performed the transformer is allowed to thoroughly dry either by allowing it to air dry or by drying it under artificially produced heat. Thereafter the entire transformer is immersed in the No. 73-D solventless varnish as indicated at 10 in Figure 8 and is maintained immersed until all bubbling ceases. The varnish 10 is kept at a temperature of 130° F.

Thereafter the transformer is removed and the varnish is cured by baking the transformer for six hours at 275° F.

Means are provided to avoid leads coming out of the unit and being subjected to constant vibration which might result in the rupture of the coating. Instead terminals as indicated at 11 in Figure 9 are attached directly to the coils 5 of the transformer by taping an extended portion of the terminals as indicated at 12 to the coils and having the terminal in place during the impregnating and coating process. The result of this is indicated in Figure 9. It is preferable to form the portion 12 of the terminal 11 of insulating material and to support the conducting portion of the terminal from such insulating material. The coating is indicated in section at 13 in Figure 9.

While specific proportions and specific materials have been given in order to accurately describe a process which has been successfully employed, it is to be distinctly understood that various similar materials could be used and various suitable changes in the proportion of the mixtures could be employed. For example, one way in which the plaster of Paris mixture could be made is to mix 160 parts of plaster of Paris with 100 parts of water, such proportion being by weight, and stirring this mixture until it is a lump-free mass. Thereafter this mixture can be formed as a cast mold around the electrical device and suitably dried either by force drying or by air drying for a period, for example of eight hours. Thereafter this coating is impregnated with a plastic resin which is prepared separately by mixing the resin with the proper amount of activator. The dried plaster coating is immersed in this plastic resin until complete impregnation is effected and is thereafter baked at 150° F. for fifteen hours. Still another method of making this plaster mixture is to mix 40 parts by weight of water with 40 parts by weight of what is commonly known as Durite No. 3026P resin. Eight parts by weight of what is known as Durite No. 3026AP activator is added to the mixture and is stirred in for approximately five minutes. Thereafter 100 parts by weight of plaster of Paris is sifted into this solution and is stirred to a lump-free consistency.

As stated, the exact proportions, temperatures, and times can be varied to suit the particular needs of the article being coated and impregnated. However, the exact temperatures, times and proportions of the parts have been given for one process which is proven eminently satisfactory.

It will be seen that a novel coating and thoroughly protected electrical device has been produced, and a novel method has been disclosed for producing such a device in which the electrical device, such as the transformer, is solidly filled with a material having good dielectric properties and good heat conducting characteristics and which is weather resistant, temperature resistant, and resistant to temperature shock. A transformer or other electrical device coated and impregnated as hereinabove described may be placed outdoors and subjected to heat, cold or rain and to the elements without danger of the entrance of moisture or deterioration from external condition. Also it has been found that the coils run cool in actual practice and act as good heat dissipators due to the solid nature of the insulation throughout the entire coils and its good heat conducting properties.

Although this invention has been described in considerable detail, it is to be understood that such description is intended as illustrative rather than limiting, as the invention may be variously embodied and is to be interpreted as claimed.

I claim:

The method of coating and impregnating an electrical device having a conducting winding comprising submerging the device in a liquid insulating material of the nature of a plastic synthetic resin capable of being polymerized, removing the device from the liquid, drying and curing the insulating material by subjecting the electrical device to heat, dipping the electrical device into a wet mixture containing plaster of Paris to a point where all of the coil is submerged but its top to thereby form a coating of plaster of Paris around the coil and across its bottom, removing the device from the plaster of Paris mixture and thoroughly drying the coated coil, submerging the electrical device in a mixture of ethyl ortho silicate to render the coating on the coil substantially impervious, inverting the electrical device to allow excess liquid to drain therefrom and thoroughly drying the device, submerging the device in an insulating liquid composed of synthetic resin which is capable of being polymerized to thereby further render the coating impervious and to completely fill the coil with the liquid insulating material, curing the insulating material to a solid mass while it completely fills the coil by subjecting the electrical device to heat, inserting the electrical device in a wet mixture containing plaster of Paris thereby forming a coating on the previously uncoated end of the coil, thoroughly drying the electrical device, and submerging the electrical device in a heated liquid insulating material composed of synthetic resin which is capable of being polymerized.

MARTIN I. ZWELLING.

REFERENCES CITED

The following references are of record in the file of this patent:

UNITED STATES PATENTS

| Number | Name | Date |
| --- | --- | --- |
| 833,580 | Clement | Oct. 16, 1906 |
| 1,827,571 | Fiene | Oct. 13, 1931 |
| 2,154,057 | Thielking | Apr. 11, 1939 |
| 2,414,525 | Hill et al. | Jan. 21, 1947 |
| 2,421,652 | Robinson et al. | June 3, 1947 |
| 2,434,492 | Ericksberg | Jan. 13, 1948 |